Jan. 13, 1925.
H. D. TOMPKINS
APPLIANCE FOR USE IN SEALING PIPE JOINTS
Filed Sept. 17, 1923
1,523,240
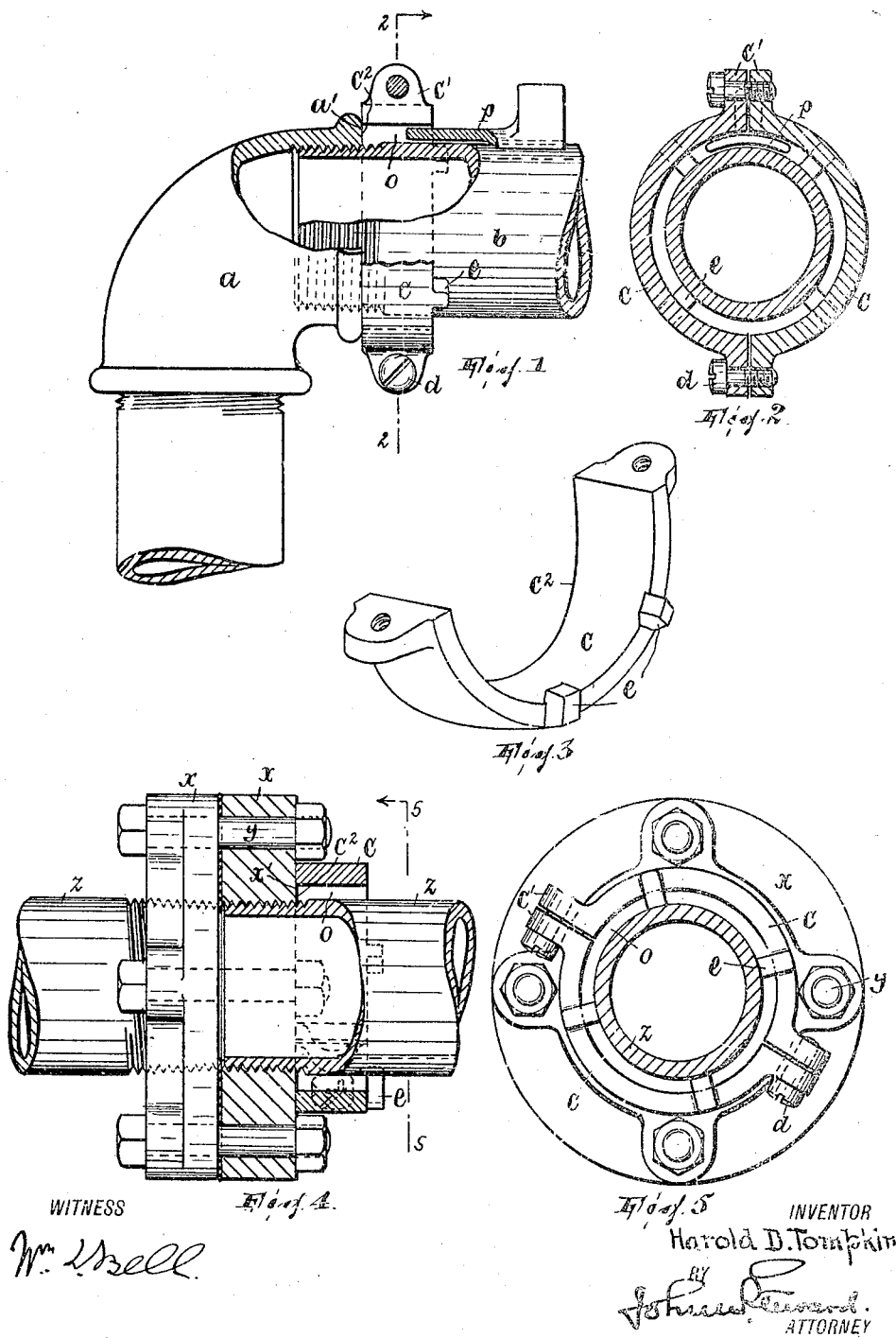
WITNESS
INVENTOR
Harold D. Tompkins
ATTORNEY Patented Jan. 13, 1925.

1,523,240

UNITED STATES PATENT OFFICE.

HAROLD D. TOMPKINS, OF JERSEY CITY, NEW JERSEY, ASSIGNOR TO SMOOTH-ON MANUFACTURING COMPANY, OF JERSEY CITY, NEW JERSEY, A CORPORATION OF NEW JERSEY.

APPLIANCE FOR USE IN SEALING PIPE JOINTS.

Application filed September 17, 1923. Serial No. 663,269.

*To all whom it may concern:*

Be it known that I, HAROLD D. TOMPKINS, a citizen of the United States, residing at Jersey City, in the county of Hudson and State of New Jersey, have invented certain new and useful Improvements in Appliances for Use in Sealing Pipe Joints, of which the following is a specification.

This invention relates to the art of sealing hermetically joints in pipe lines. Given two members which form the joint to be sealed, one the receiving member and the other the received member and the former affording a shoulder facing in one direction lengthwise of the pipe line, my invention contemplates providing an appliance including a dam to be placed around the received member so that it will abut said shoulder and having a plurality of lugs spaced circumferentially of the dam from each other and projecting radially inward; thus the dam when placed as stated will form with said shoulder and received member a space extending circumferentially of the pipe line and into which the leaking interstice of the joint leads and which is adapted to have packed therein, as by a tamping operation, the material which is to seal said interstice, and the said lugs will afford bearing points for the dam against said received member in definitely positioning the dam. In the best form of the invention I actually construct the appliance as a clamp, in which case said lugs limit the free constricting action of the dam when being applied, so that the latter when ultimately fitted to the received member stands in solid or rigid relation thereto, due to its own clamping action. In the said best form I prefer also to arrange the mentioned lugs at one edge of the dam and so that, while projecting radially inward from the dam, they will stand offset or at the outer side of a plane which is transverse of the dam and coincident with its said edge; the object of this detail will be hereinafter more fully explained.

In the drawing,

Fig. 1 is a side elevation, partly in section, of one form of a pipe joint showing my device in its best form, and also partly in section, fitted to the received or male member of the joint preparatory to packing the joint;

Fig. 2 is a section on line 2—2, Fig. 1;

Fig. 3 is a perspective view of one section or element of the clamp.

Fig. 4 is a side elevation, partly in section, of another form of pipe joint showing my device, also partly in section, fitted to the received or male member of the joint preparatory to packing the joint; and Fig. 5 is a section on line 5—5, Fig. 4.

Let $a$ indicate the receiving or female and internally screw-threaded member of a pipe joint of the screw-joint type, and $b$ the received or male and externally threaded member; my invention is especially applicable to these joints, though it may be applied to other than screw-threaded joints. The end $a'$ of member $a$ forms the aforementioned shoulder facing in one direction lengthwise of the pipe line.

The dam, which as hereinbefore mentioned appears in the drawing in its best form, is there shown as a band-like element formed in two sections $c$ which are counterparts of each other and have radial exterior ears $c'$ by which, through the medium of screws $d$, the sections are secured together and made to clamp the member $b$ of the joint. On the dam, so as to form lateral projections on one edge thereof, are integral lugs $e$ which project radially inward; they are equidistantly spaced from each other. Each lug stands in the best form almost, if not quite, entirely at the outer side of a plane which is transverse of the dam and coincident with its said edge, so that between that edge and the opposite edge the interior surface of the dam is uninterrupted by the lugs. The opposite edge of the dam I term its seat, $c^2$.

In Figs. 4 and 5 a joint is shown of the type wherein the internally threaded receiving or female member is not afforced by the complementary pipe but by a disk $x$ (adapted to be secured by bolts, as $y$, to another such disk) which is screwed onto the externally threaded male or received pipe member $z$; the dam in these figures is the same as that already described in detail.

When a joint is to be sealed the dam is made to embrace the received member ($b$ or $z$) of the joint and, being placed with its seat $c^2$ in contact with the shoulder $a'$ (or $x'$) of the receiving member $a$ (or $x$), the screws $d$ are tightened until the lugs $e$ bear against the member *b* (or *z*) rigdily, thus at once centering the dam and securing it in fixed-relation to the joint. When the dam has thus been rigidly secured in position the sealing substance is filled into the space formed at *o* and then it is tamped in solidly with the use of a tool, such as I show at *p* in Figs. 1 and 2, and a hammer. The lugs *e* of course serve as centering and bearing means for the dam, as stated. They are made to stand offset from what is the free edge of the dam when it is in working position so that concealing them in filling the space *o* may be avoided, for if they are concealed when the tamping is performed one or more blows of the tamping tool, effected against a lug or lugs, would result to no purpose and, by jarring the dam would disturb the sealing already effected, and the workman could not gage how closely to the lugs he could tamp, so that in their immediate vicinity proper tamping might be neglected if performed at all. These lugs preferably reach as little as possible into the dam—i. e., toward its seat $c^2$—so that the tamping can be performed on these portions of the sealing substance which stand relatively behind them.

My invention consisting broadly in an appliance in the form of a dam to be placed around the received member of a pipe joint and having a lateral seat on one side so that said seat may abut the mentioned shoulder of the receiving member thereof and having at the other side a plurality of lugs spaced circumferentially of the dam from each other and projecting laterally and also radially inward to afford bearing points for the dam against said received member in definitely positioning the dam, it is not material what substance is used as the sealing substance. But I may remark that the invention has particularly in mind to obtain a sealing, at once hermetic and lasting, of joints of the kind specified in pipe lines for more or less heavy pressures, whether water, steam, air or gas, for which purpose I propose to use a substance which is largely comminuted iron and an oxidizing agent, and when applied is mixed with water and so is plastic. After this substance has been tamped into the space *o* in that form of the invention where, as herein shown and described, the appliance is a clamp it is best not to remove the appliance but to leave it positioned, since the oxidation of said substance is attended by appreciable expansion, which is a factor that works to very good advantage in insuring the integrity of the seal if it is confined and remains confined by the dam. The method of forming a seal in pipe joints here involved, and consisting, generally stated, in securing a dam to the received member with its seat abutting the shoulder of the receiving member of the joint and so that a space is formed between the dam and said received member and then packing the space with a substance which, in a manner of setting or hardening, will expand I reserve for a separate application.

It may be added that in point of fact each section *c* forms in itself a dam, the other section and the screws *d* constituting means to secure such a dam in place; so I do not wish to be limited to a dam which, as herein shown and described, is endless.

Having thus fully described my invention, what I claim and wish to secure by Letters Patent is:

An appliance of the class described including a dam formed to extend around the received member of the joint to be sealed and having a lateral seat at one side to abut the longitudinally facing shoulder of the receiving member of the joint and at the other side having lugs spaced circumferentially of the dam and projecting laterally and also radially inward and each adapted to bear against the received member of the joint to gage the position of the dam relatively to said received member.

In testimony whereof I affix my signature.

HAROLD D. TOMPKINS.